United States Patent [19]

Yoshino et al.

[11] Patent Number: 5,721,766

[45] Date of Patent: Feb. 24, 1998

[54] COMMUNICATION APPARATUS ABLE TO CALL PLURAL DESIGNATED DESTINATIONS

[75] Inventors: Motoaki Yoshino; Masatomo Takahashi; Tsunehiro Watanabe; Shigeo Miura, all of Tokyo; Takeshi Toyama, Hiratsuka, all of Japan

[73] Assignee: Canon Kabushiki Kaisha, Tokyo, Japan

[21] Appl. No.: 227,984

[22] Filed: Apr. 15, 1994

Related U.S. Application Data

[63] Continuation of Ser. No. 974,342, Nov. 10, 1992, abandoned, which is a continuation of Ser. No. 546,685, Jul. 2, 1990, abandoned, which is a continuation of Ser. No. 80,093, Jul. 31, 1987, abandoned.

[30] Foreign Application Priority Data

Aug. 4, 1986 [JP] Japan .................. 61-183026

[51] Int. Cl.⁶ .................................. H04M 11/00
[52] U.S. Cl. .......................... 379/100; 358/440
[58] Field of Search .......................... 379/100, 355, 379/356, 216, 40, 51; 358/400, 401, 402, 403, 404, 405, 407, 408, 440, 434; 345/156, 158

[56] References Cited

U.S. PATENT DOCUMENTS

| | | | |
|---|---|---|---|
| 3,573,389 | 4/1971 | Greenstein et al. | 379/216 |
| 3,705,953 | 12/1972 | Lemelson | 358/440 |
| 3,843,841 | 10/1974 | Rubinstein | 379/51 |
| 4,119,810 | 10/1978 | Marin | 379/40 |
| 4,503,288 | 3/1985 | Kessler | 379/51 |
| 4,511,764 | 4/1985 | Nakayama et al. | 379/354 |
| 4,558,369 | 12/1985 | Shinohara et al. | 379/100 |
| 4,710,951 | 12/1987 | Itezono | 379/100 |
| 4,727,576 | 2/1988 | Yoshida | 379/100 |
| 4,741,021 | 4/1988 | Kotani et al. | 358/257 |
| 4,754,335 | 6/1988 | Izawa et al. | 379/100 |
| 4,759,053 | 7/1988 | Satomi et al. | 379/100 |
| 4,764,951 | 8/1988 | Kotani et al. | 379/100 |
| 4,941,170 | 7/1990 | Herbst | 358/440 |

FOREIGN PATENT DOCUMENTS

| | | | |
|---|---|---|---|
| 3439867 | 5/1985 | Germany | 379/355 |
| 56-149156 | 11/1981 | Japan . | |
| 59-63854 | 8/1984 | Japan . | |
| 59-134664 | 9/1984 | Japan . | |
| 60-91754 | 9/1985 | Japan . | |
| 61-105159 | 5/1986 | Japan | 379/355 |
| 61-107844 | 5/1986 | Japan . | |

OTHER PUBLICATIONS

"Effective & Economical Speed Calling Service"; Fujitsu Limited Communications and Electronics.

*Primary Examiner*—Steven Saras
*Attorney, Agent, or Firm*—Fitzpatrick, Cella, Harper & Scinto

[57] ABSTRACT

A communication apparatus capable of designating plural destinations in a simple manner. The communication is automatically initiated after the lapse of a predetermined time from the designation of at least one destination, so that the operator is not required to actuate an end key after the designation of plural destinations.

55 Claims, 8 Drawing Sheets

COMMUNICATION APPARATUS ABLE TO CALL PLURAL DESIGNATED DESTINATIONS

This application is a continuation of application Ser. No. 07/974,342 filed Nov. 10, 1992, now abandoned, which is a continuation of Ser. No. 07/546,685 filed Jul. 2, 1990, now abandoned, which is a continuation of Ser. No. 07/080,093 filed Jul. 31, 1987, now abandoned.

BACKGROUND OF THE INVENTION

1. Field of the Invention

The present invention relates to a communication apparatus, and more particularly a communication apparatus with automatic calling function for automatic communication with plural destinations.

2. Related Background Art

In such known apparatuses, the designation of plural destinations has been made by a procedure different from that for designating a single destination. More specifically, the designation of plural destinations has involved a key operation for starting a mode for designating plural destinations, and another operation for ending said mode, and, for this reason, has necessitated complex structure and control for such operations.

SUMMARY OF THE INVENTION

An object of the present invention is to provide an improvement on the known communication apparatuses as described above.

Another object of the present invention is to eliminate the above-mentioned drawbacks.

Still another object of the present invention is to enable, in a communication apparatus, a communication by merely designating a destination.

Still another object of the present invention is to enable communication without the actuation of a key indicating the end of designation of destinations.

Still another object of the present invention is to enable designation of plural destinations in an operation procedure similar to that required for designation of a single destination.

Other objects features and advantages of the present invention will become fully apparent from the following description of the preferred embodiments, taken in conjunction with the accompanying drawing.

DETAILED DESCRIPTION OF THE PREFERRED EMBODIMENTS

Now the present invention will be clarified in detail by reference to the preferred embodiments thereof, shown in the attached drawings.

Figure 1:
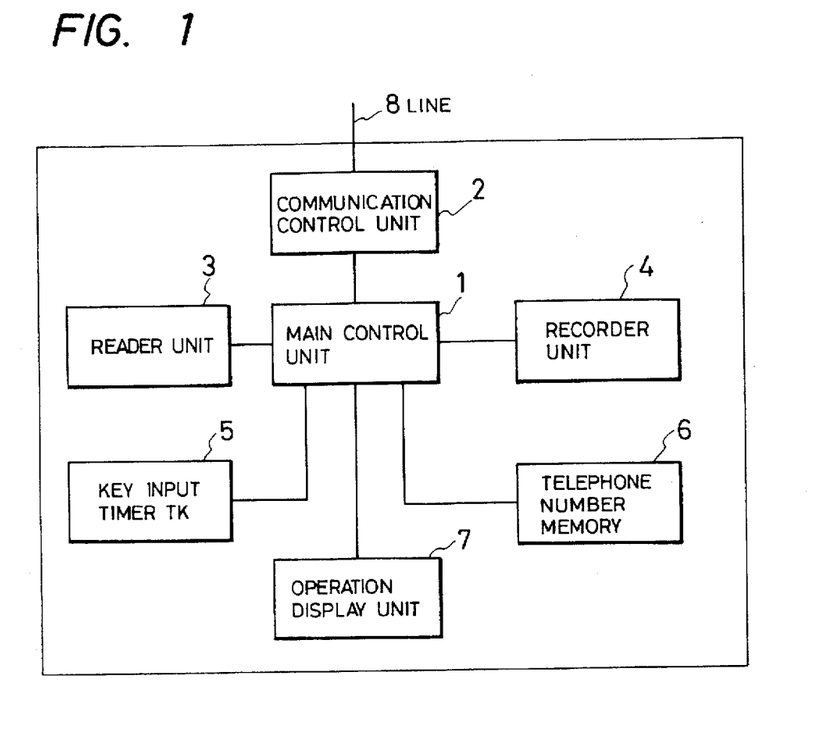
FIG. 1 is a block diagram of a first preferred embodiment of the present invention.

FIG. 1 is a block diagram of the basic structure of a facsimile apparatus embodying the present invention.

In FIG. 1, a main control unit 1 for controlling the entire apparatus is composed of a microcomputer and peripheral devices such as a read-only memory (ROM) for storing the control programs for said microcomputer, a random access memory (RAM), I/O ports etc.

A communication control unit 2, for controlling the communication of image data, includes an encoding circuit for encoding and decoding of image data in modified Huffman (MH) process or modified READ (MR) process, a modem for modulating and demodulating image data, a communication control circuit for effecting the facsimile communication according to a procedure recommended by CCITT, and a dialling circuit for effecting a dialling operation on a communication line 8 according to dialling data supplied from the main control unit 1.

A reader unit 3 for reading an original document is composed for example of a CCD as already known in the facsimile apparatus.

A recorder unit 4, for recording the image data, is composed of a printer conventionally employed 1 in the facsimile apparatus.

A timer 5 sets a time for discrimination of the key input to be effected by the main control unit 1. In the present embodiment said timer 5 is a 5-second timer, and, if a key input is detected before the timer times out or expires i.e., before the end of the timer period, the main control unit 1 resets 5 for detecting a succeeding key input.

A memory 6 for storing telephone numbers is provided with three areas for one-touch keys, contracted (or abridged) dial keys and numeral keys.

An operation-display unit 7, for enabling the operator to operate the facsimile apparatus, is provided with key input switches such as one-touch keys, numeral keys, function keys, start keys, etc., display devices such as liquid crystal display devices, and indicator lamps.

Figure 2A:
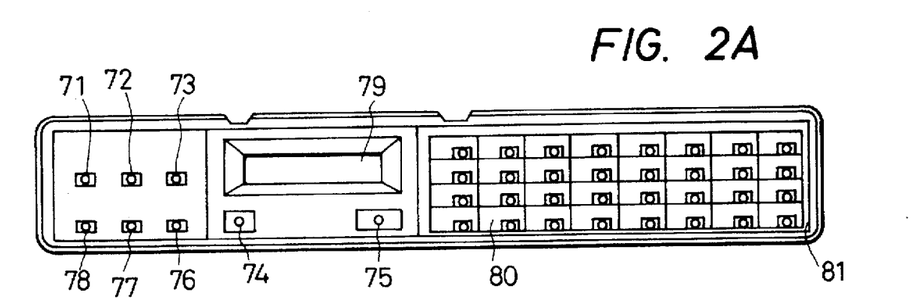
FIGS. 2A and 2B are plan views of an operation-display unit 7 shown in FIG. 1.
Figure 2B:
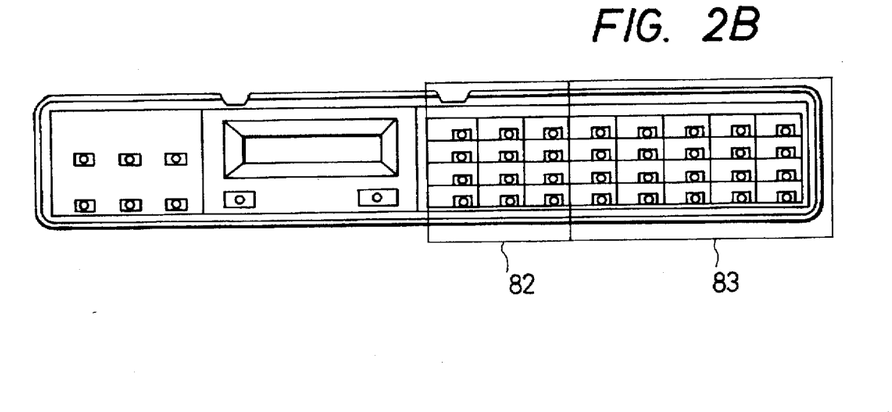

FIGS. 2A and 2B illustrate the arrangement of key switches and display device of said operation-display unit 7. In a state shown in FIG. 2A, wherein a panel cover 81 is closed, the plural key input buttons function as one-touch dialling buttons 80, but in the state shown in FIG. 2B, wherein the panel cover 81 is open, said plural key input buttons are used as function keys 82 and numeral keys (or ten-key) data registration keys 83.

In FIG. 2A there are also shown a manual reception button/lamp 71; a density adjusting button/lamp 72; a telephone button/lamp 53; a stop button 74; a start button 75; a fine button/lamp 76; a halftone button/lamp 77; and a minifax button/lamp 78.

In the present embodiment, designation of a destination and designation of plural destinations are achieved in similar manner by means of the one-touch dialling buttons 80 shown in FIG. 2A, or of contracted dialling or ordinary dialling with the numeral keys 83 shown in FIG. 2B. The automatic calling is made simply by the successive input operations of the operator for designating the destinations using the one-touch dialling buttons, contracted dialling keys and/or numeral key. The automatic calling is also made by the actuation of the start key 75 after the inputs of destinations.

Now reference is made to the flow charts shown in FIGS. 3A to 3E, for explaining the function of the above-explained embodiment. Said flow charts illustrate the control sequence of the main control unit, executed according to programs stored in the ROM of the main control unit.

At first there will be briefly explained the process of designating the destinations in the present embodiment.

In the present embodiment, the key input timer TK is activated at first, and an automatic calling is made if at least one destination is designated before the expiration of the time period of said timer TK.

The telephone number memory 6 has areas for storing telephone numbers respectively corresponding to the one-touch dialling buttons 80 ((1)–(32)) and contracted dialling keys (*00–*99), in which the operator registers telephone numbers corresponding to said one-touch dialling buttons and contracted dialling keys. The telephone number memory 6 also has an area for storing telephone numbers to be entered with the numeral keys 83. In the present embodiment said area can store telephone numbers of four destinations, but the number of such destinations is naturally not critical. Said area is provided for enabling designation of plural destinations with the numeral keys 83, in addition to the designation with the one-touch dialling buttons 80 and the contracted dialling keys.

Figure 4:
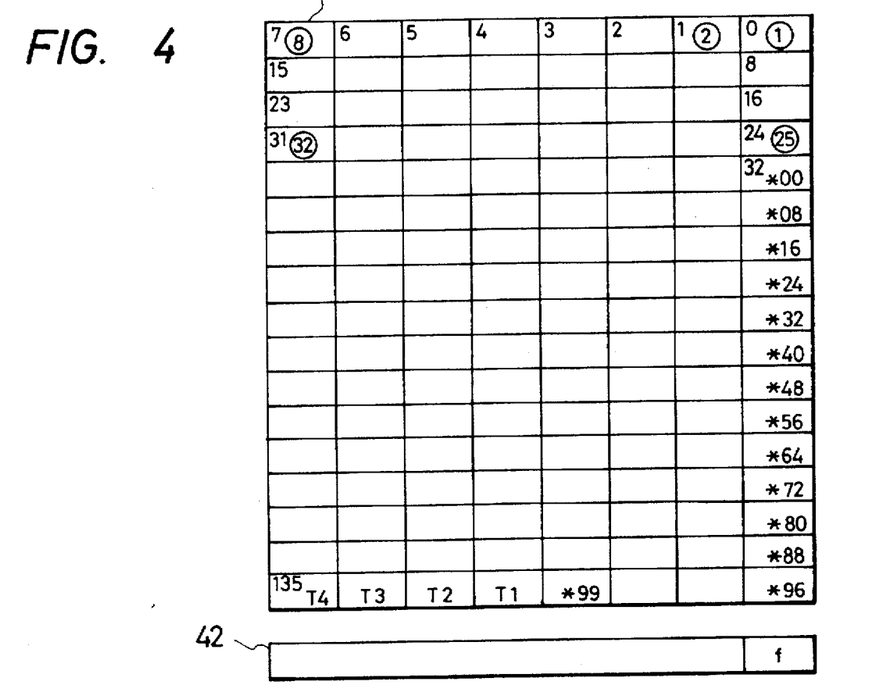
FIG. 4 is a chart showing a destination party flag 41 and a party presence/absence flag 42.

The telephone number memory 6 is further provided, as shown in FIG. 4, with an area for storing destination party flags 41 and destination presence flags (f) 42. In said flags 41 one bit is allotted for each of the one-touch dialling buttons (1)–(32), contracted dialling inputs *00–*99, and telephone number inputs T1–T4 with the numeral keys. A flag state "1" indicates that a designation has been made of that destination, while a flag state "0" indicates the absence of such designation. The operator performs designations in succession with the one-touch dialling buttons (1)–(32), contracted dialling inputs *00–*99 and ordinary dialling inputs T1–T4 with the numeral keys 83, and a flag "1" is set in each bit corresponding to each designated destination. Then a presence flag "1", indicating the presence of destination party, is set when the destination is confirmed. When the calling operation is started after the designating operation, the main control unit 1 scans the destination party flag 41 in the sequence from "0" to "135" shown in FIG. 4, and reads telephone numbers in succession from the telephone number memory 6, corresponding to the flag "1", thereby making calling operations. In these calling operations, the calls are made not in the order of the designations made by the operator, but in the order of the one-touch dialling buttons (1)–(32), contracted dialling inputs *00–*99 and ordinary dialling inputs T1–T4 with the numeral keys.

Now reference is made to the flow charts shown in FIGS. 3A to 3E.

Figure 3A:
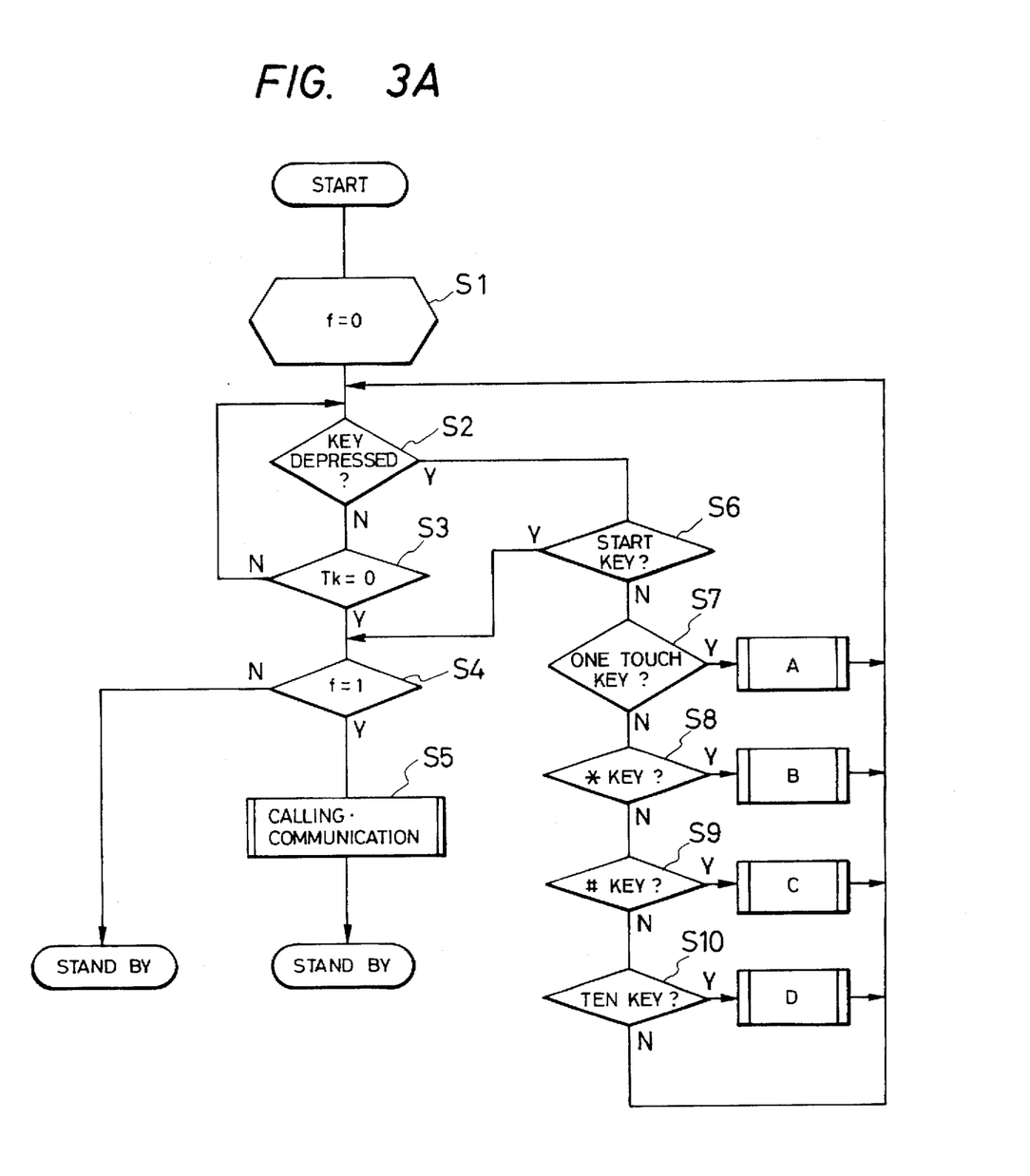
FIGS. 3A to 3E are flow charts showing the control sequence of a main processor 1 shown in FIG. 1.

At first a step S1 clears the destination party flags 41 and the destination presence flags 42. Then steps S2 and S3 detect the key input until the timer TK expires. When the step S3 detects the expiration of the timer TK, a step S4 discriminates whether the destination presence flag is in a state "1". If it is in "0", indicating the absence of designation, the program returns to a stand-by state. On the other hand, if said flag is "1", the sequence proceeds to a step S5 for calling the designated destination to effect a facsimile transmission.

On the other hand, if the step S2 detects a key input before the expiration of the timer TK, steps S6 to S10 identify the depressed key. If the depressed key is the start key 75, the sequence proceeds from the step S6 to the step S4. If it is one of the one-touch dialling button 80, the sequence proceeds from the step S7 to a subroutine A. If it is the "*" key, the sequence proceeds from the step S8 to a subroutine B. If it is the "#" key, the sequence proceeds from the step S9 to a subroutine C. If it is one of the numeral keys 83, the sequence proceeds from the step S10 to a subroutine D. If none of these keys has been depressed, the sequence returns to the step S2.

Figure 3B:
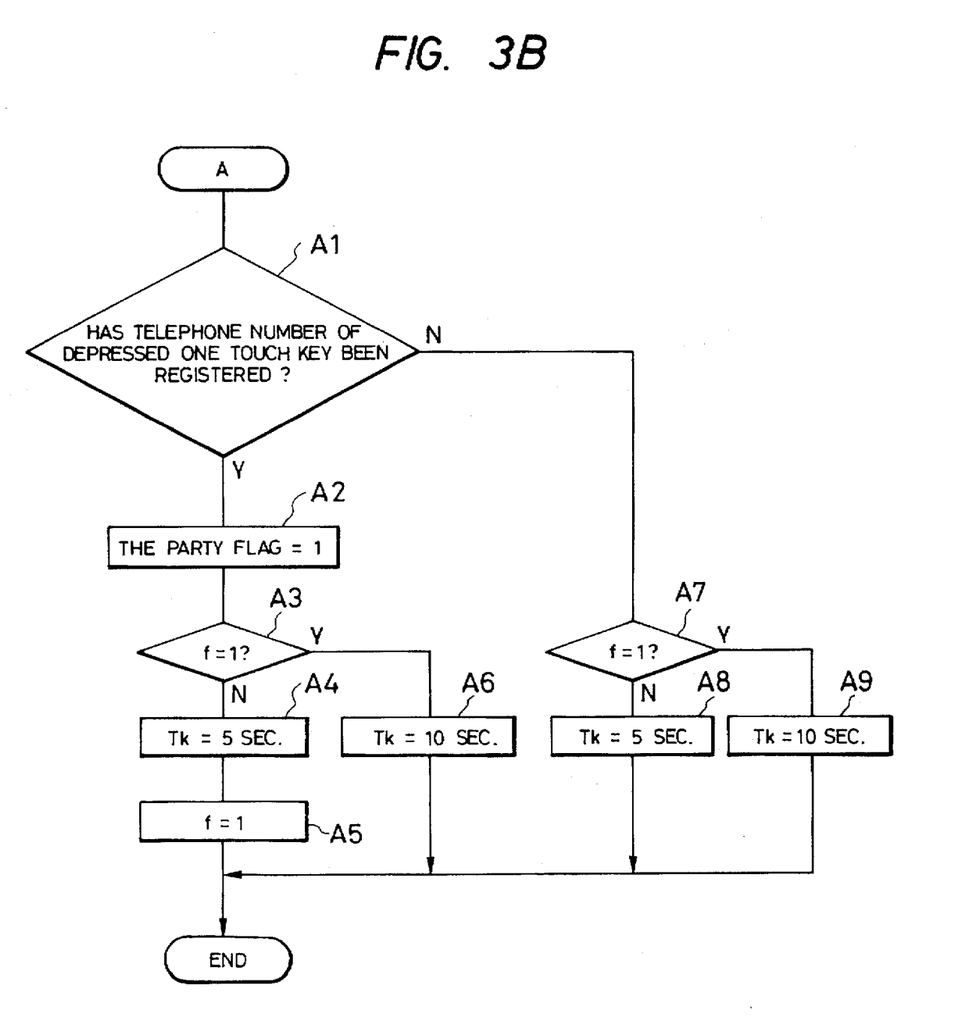

The subroutine for the one-touch dialling buttons, shown in FIG. 3B, is started when the step S7 identifies the actuation of one of the one-touch dialling buttons 80. At first a step A1 discriminates whether a telephone number has been registered corresponding to the depressed one-touch dialling button. If such telephone number has not been registered, the sequence proceeds to a step A7 for discriminating whether the destination presence flag 42 is in a state "1", and, if not, a step A8 sets a time of 5 seconds in the key input timer TK. On the other hand, if said flag 42 is in a state "1", a step A10 sets a time of 10 seconds in said timer TK.

On the other hand, if the step A1 discriminates that a telephone number has been registered corresponding to the depressed one-touch dialling button, a step A2 sets "1" in a bit of a destination party flag 41 corresponding to the depressed one-touch dialling button, and a step A3 then executes a discrimination similar to that in the step A7. If the destination presence flag 42 is identified as "1" in this step, a step A6 sets 10 seconds in the key input timer TK. Then a step A5 sets said destination presence flag 42 to "1". After the completion of said subroutine A, the sequence returns to the step S2 shown in FIG. 3A.

Figure 3C:
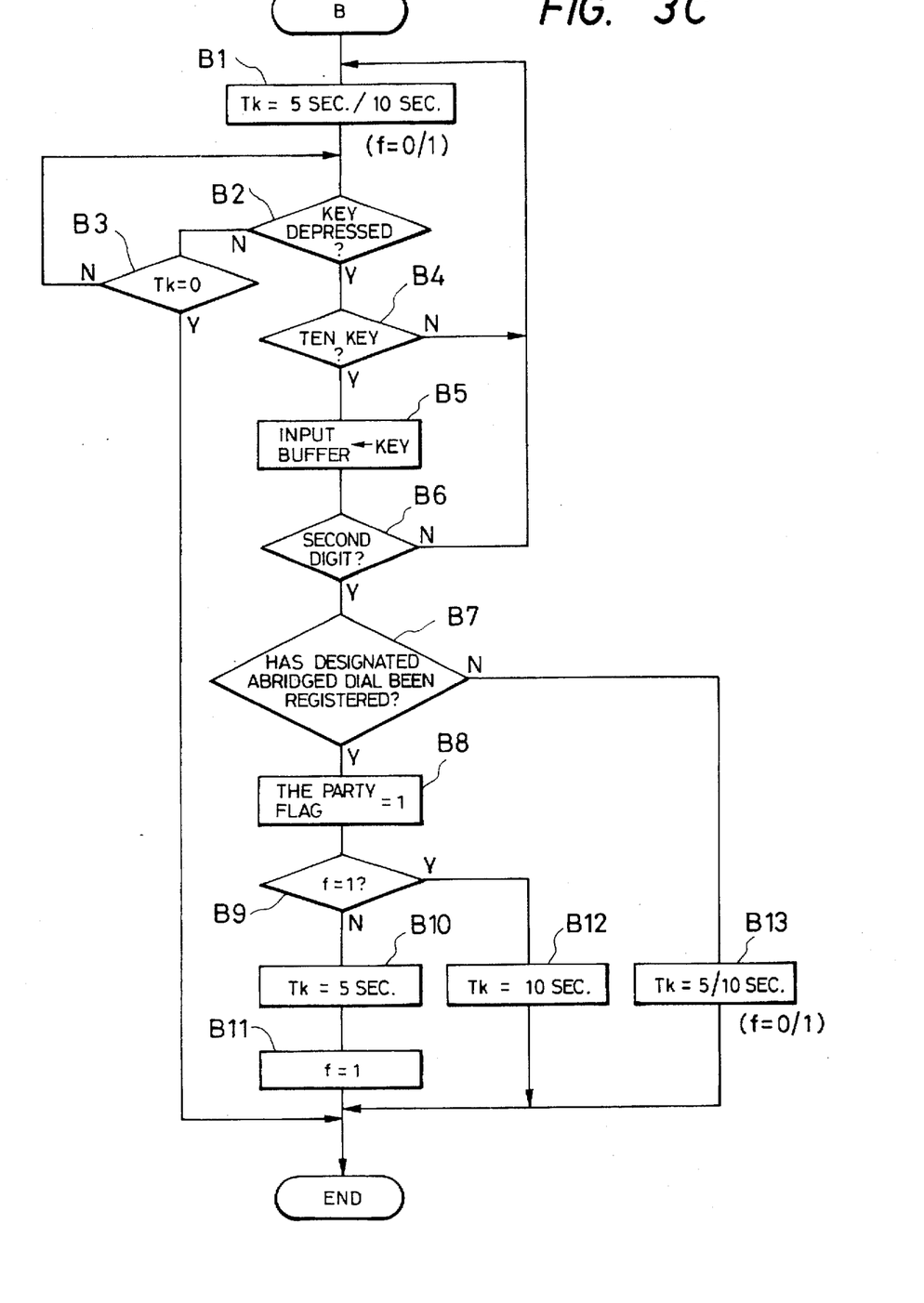

In the subroutine B for the contracted dialling inputs shown in FIG. 3C, a step B1 sets 5 seconds or 10 seconds in the key input timer TK according to the state of the destination presence flag 42, through operations similar to those of the steps A7, A8 and A9 of the subroutine A, and steps B2, B3 detect the key depression until the expiration of said timer TK. If the step B2 detects a key depression before the expiration of the timer, the sequence proceeds to a step B4 for identifying whether the depressed key is one of the numeral keys 83, and the sequence proceeds to a step B5 or returns to the step B1 respectively when the depressed key is a numeral key or not.

The step B5 stores numerical data corresponding to the depressed numeral key into the input buffer, and a step B6 discriminates whether the depressed numeral was represents a second digit. Then the sequence proceeds to a step B7 or returns to the step B1 repectively when the depressed key is the second digit or not.

The step B7 discriminates whether a telephone number has been registered corresponding to the contracted dial number consisting of two-digit number entered by the numeral keys and stored in the input buffer. If a telephone number has not been registered, the sequence proceeds to a step B13 for setting 5 or 10 seconds in the input timer TK in the same manner as in the step B1. On the other hand, if a telephone number has been registered, steps B8, B9, B10, B11 and B12 are executed in the same manner as the steps A2, A3, A4, A5 and A6 in the subroutine A. In this manner "1" is set in a bit of destination party flag corresponding to the entered contracted dial number. After the completion of the subroutine B, the sequence proceeds to the step S2 shown in FIG. 3A.

Figure 3D:
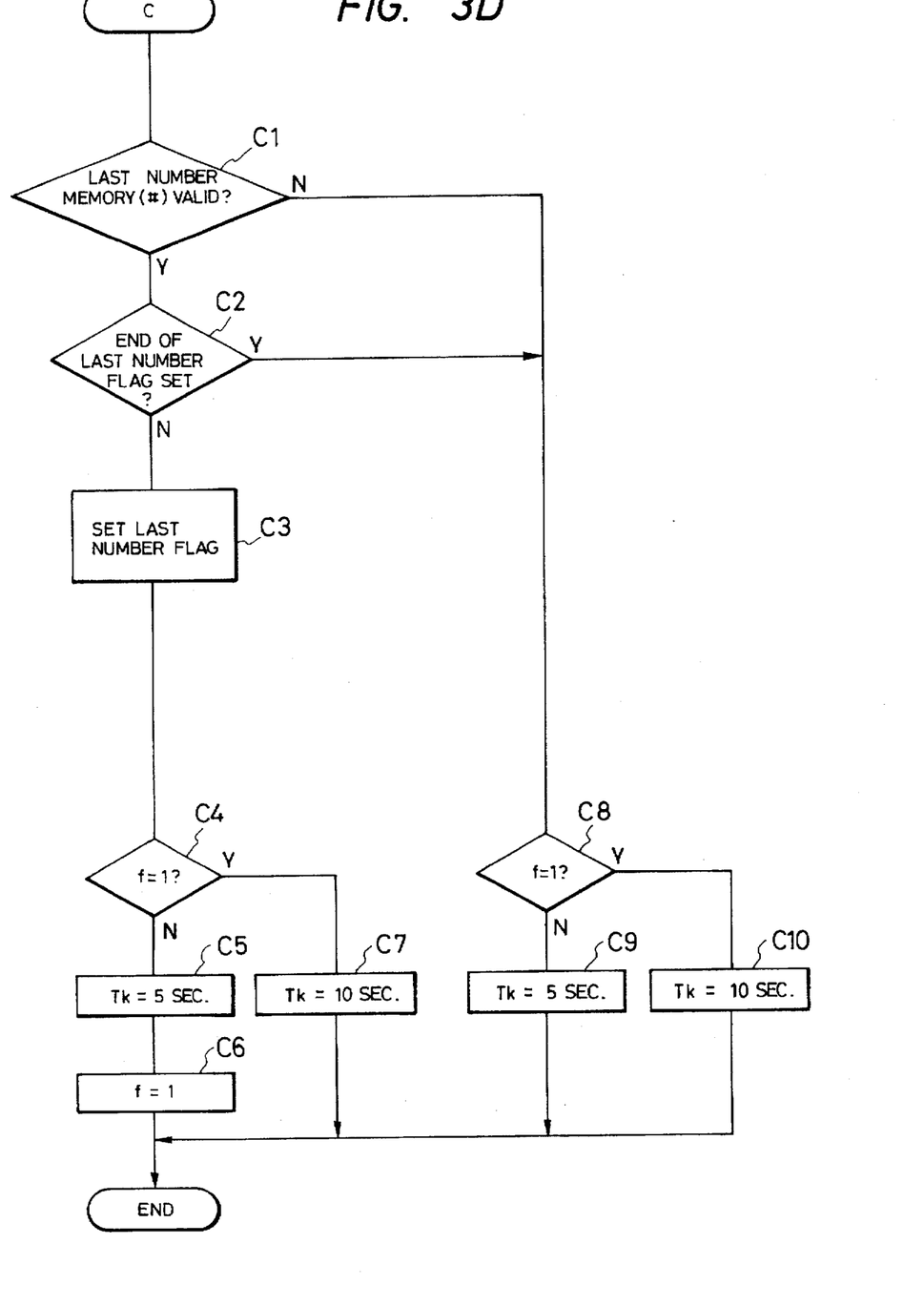

The subroutine C, shown in FIG. 3D, is used for designating the telephone number of a last designated destination. The last number is identified by the depression of the "#" key, and the sequence proceeds to the subroutine C from the step S9. A step C1 discriminates whether a telephone number has been stored in a last number memory area of the telephone number memory 6, and, if stored, the sequence proceeds to a step C2. On the other hand, if a telephone number has not been stored, steps C8, C9 and C10 are executed in the same manner as the steps A7, A8 and A9 in the aforementioned subroutine A.

The step C2 discriminates whether a last number flag has been set, and, if it has been set, the sequence proceeds to a step C8. On the other hand, if the last number flag has not been set, a step C3 sets the last number flag, and steps C4, C5, C6 and C7 are executed in similar manner as the steps A3, A4, A5 and A6 in the subroutine A. After the completion of the subroutine C, the sequence returns to the step S2 shown in FIG. 3A.

Figure 3E:
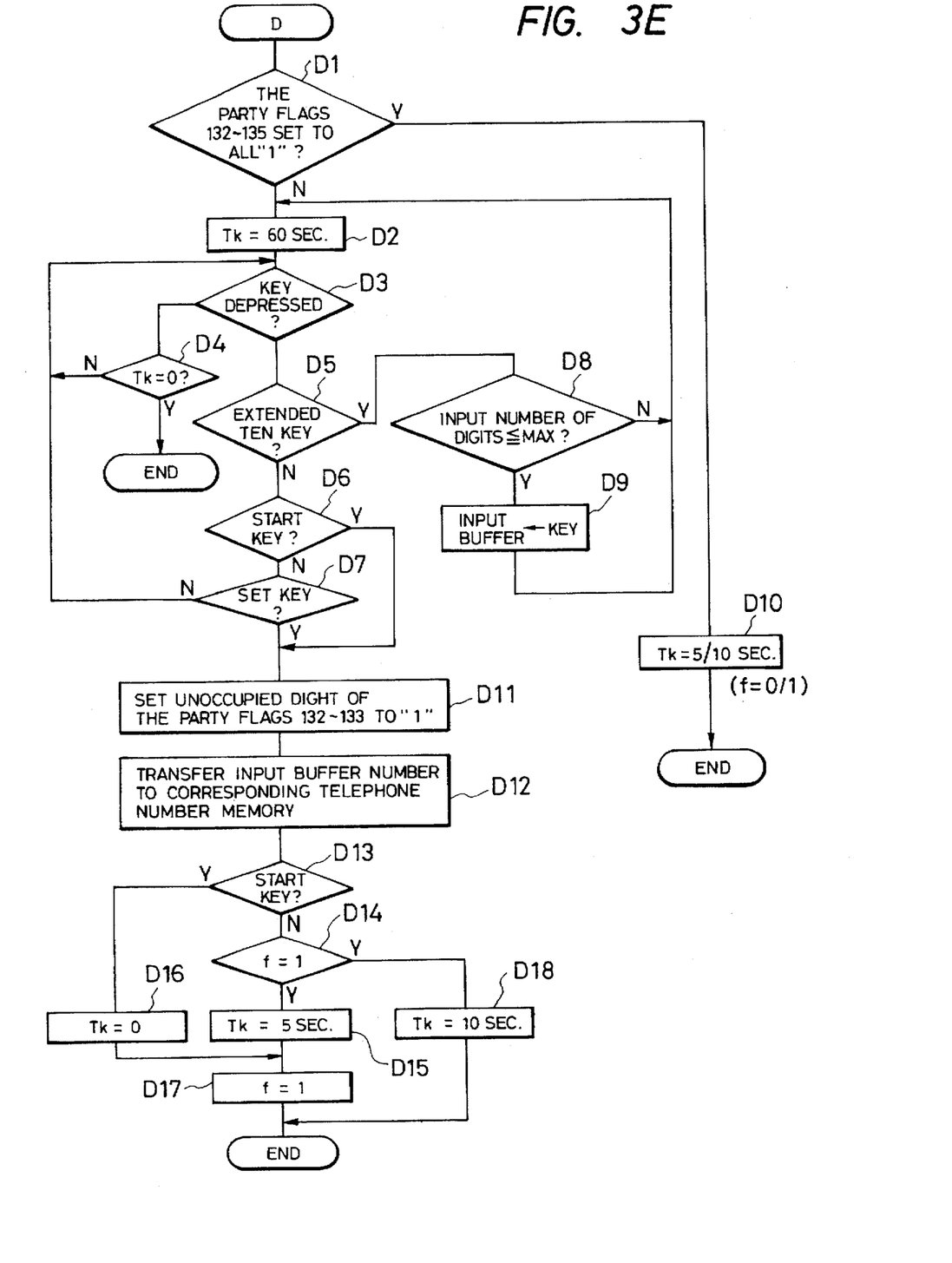

The subroutine D for dialling with the numeral keys, shown in FIG. 3E, is initiated when the step S10 shown in FIG. 3A discriminates the actuation of a numeral key.

A step D1 discriminates whether the bits 132 to 135 of the destination party flags 41, corresponding to the ordinary dialling numbers T1–T4, are all set to "1", and, if said bits are all set, indicating that telephone numbers are already stored in the areas T1–T4, the sequence proceeds to a step D10. On the other hand, if said bits 132–135 are not all "1", the sequence proceeds to a step D2. The step D10 performs a function similar to that of the step B1 in the above-explained subroutine B.

The step D2 sets 60 seconds in the key input timer TK, and steps D3 and D4 detect key depression unitl the timer TK expires. When the step D3 detects a key depression, a step D5 discrimiates whether the depressed key is one of the expanded numeral keys for 0–9, *, #, space, pause, and second call sound detection, and, if the depressed key is one of the expanded numeral keys, a step D8 discriminates whether or not the number of digits of the already entered numeral keys exceeds the maximum number of digits. The present embodiment can store telephone numbers up to 20 digits. The sequence returns to the step D2 if the maximum number of digits is exceeded. On the other hand, if said number is not exceeded, a step D9 stores the entered key data in the input buffer, and the sequence returns to the step D2. The telephone numbers are stored in the input buffer by repeating the steps D2, D3, D4, D5, D8 and D9.

In case the step D5 identifies that the depressed key is not an expanded numeral key, and if a step D6 or D7 discriminates that the depressed key is the start key 75 or the set key, the sequence proceeds to a step D11.

The step D11 sets "1" in an empty bit among the bits 132–135 of the destination party flag 41, and a step D12 stores the telephone number of the input buffer in one of the telephone number memory area T1–T4 corresponding to the destination party flag "1" set as explained above. Then a step D13 discriminates whether the start key 75 has been depressed, and, if not, a step D14 discriminates whether a destination presence flag 42 has been set. If said flag has been set, a step D18 sets 10 seconds in the key input timer TK. On the other hand, if said flag has not been set, a time of 5 seconds is set in said timer TK, and a step D17 sets the destination presence flag to "1".

On the other hand, if the step D13 discriminates that the start key 75 has been depressed, the step D16 sets 0 second in the key input timer TK and the sequence proceeds to the step D17. Upon completion of the subroutine D, the sequence returns to the step S2 shown in FIG. 3A.

In the present embodiment, as explained in the foregoing, a time of 5 seconds is set in the key input timer TK when no destination is designated or only one destination is designated, but a time of 10 seconds is set when two destinations are designated. Also a time of 60 seconds is set in a case of entering a telephone number with the numeral keys. The time to be set in said timer is not necessarily limited to 5, 10 or 60 seconds, but a somewhat longer time is to be allotted for the entry with the numeral keys, in order to prevent the start of calling operation during the entry of a telephone number. This is because the telephone number entry with the numeral keys requires a longer time in comparison with the entry with the one-touch dialling buttons (1)–(32) or with the contracted dialling *00–*99.

Also, in the present embodiment, the actuation of the start key 75 indicates the end of designation of all the destinations and initiates the calling operation.

Figure 5:
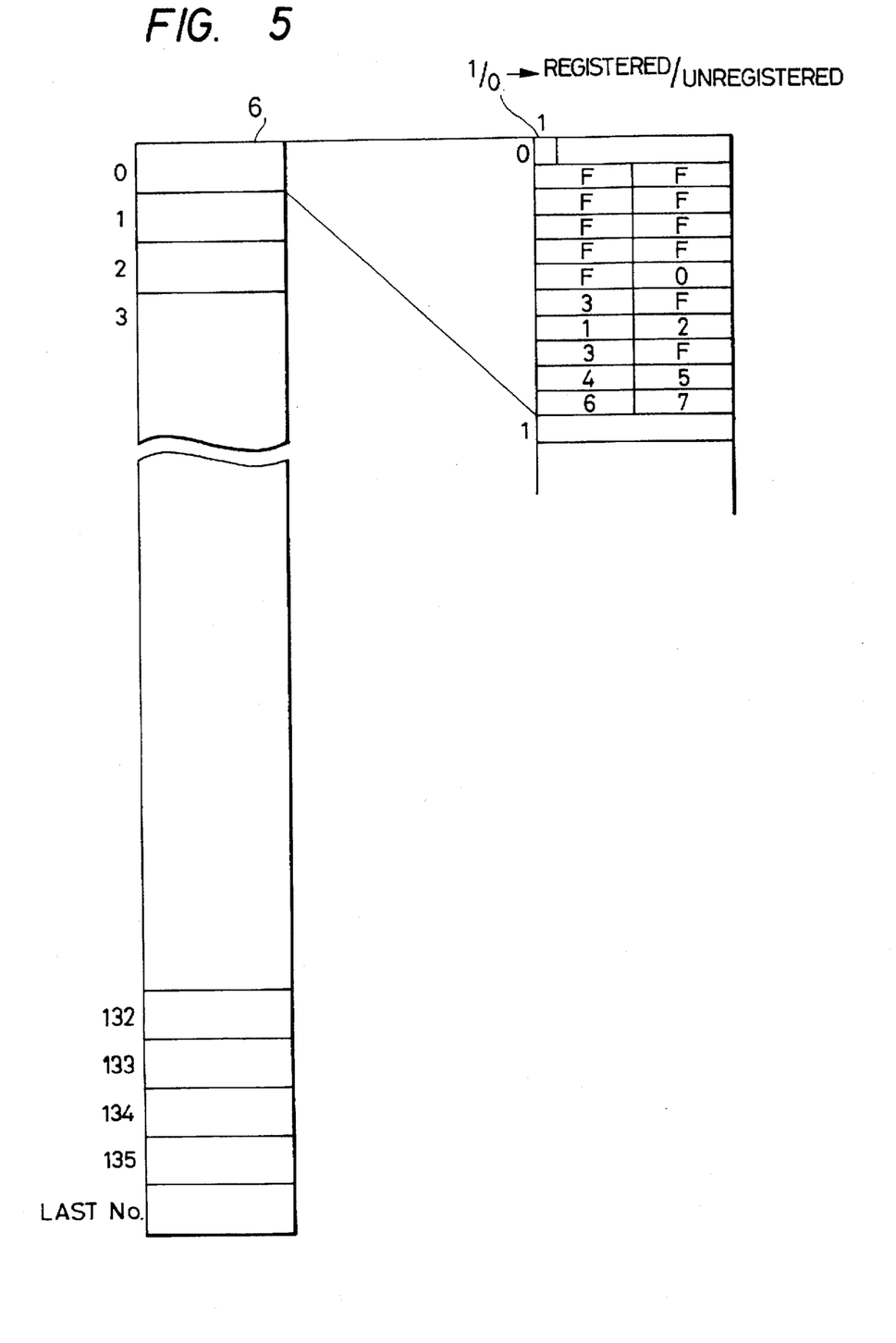
FIG. 5 is a view of a dial data area of a telephone number memory 6.

FIG. 5 illustrates the memory area of the telephone number memory 6. A telephone number 0–F is stored for each of the bits 0–135 of the destination party flag 41. The numbers 0–F are stored by a 4-bit code, in which 0–9 represent numeral keys 0–9, A represents "*" key, B represent "#" key, C stands for the second call sound key, D stands for a pause key of 3 seconds, E stands for a pause key of 10 seconds, and F stands for the space key. In front of the telephone number there is provided a bit indicating whether a telephone number is registered.

Figure 6:
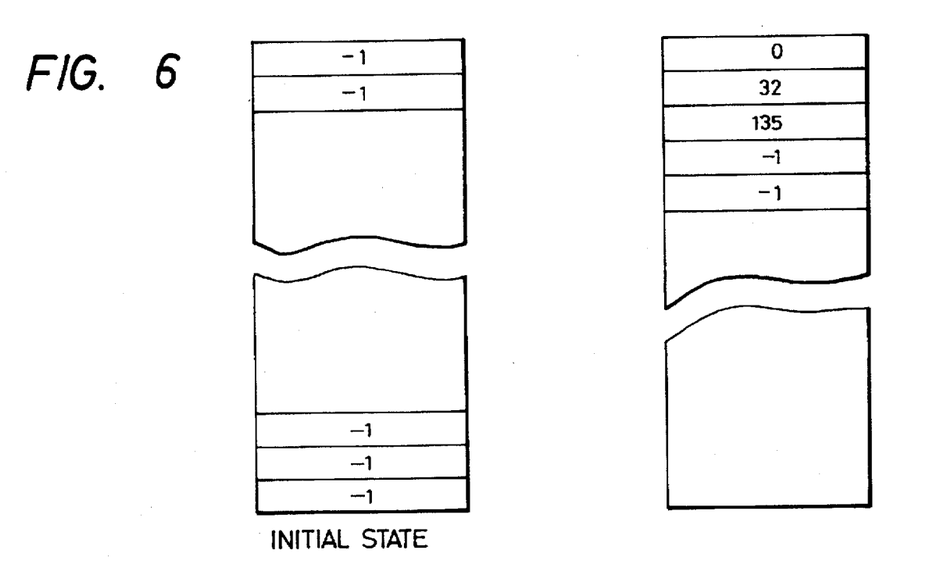
FIG. 6 is a view of a buffer memory for calling, constituting another preferred embodiment.

In the foregoing embodiment, the destination party flags 41 "1" are set in the bits corresponding to the designated destinations, and these bits are scanned by the main control unit at the calling operations. However it is also possible to store, in a buffer memory as shown in FIG. 6, index numbers 0–135 indicating the designated destinations in the order of designation and to read the index numbers from said buffer in the order of designation at the calling operations. The buffer stores "–1" in all the addresses in the initial state as shown in FIG. 6, and the main control unit 1 identifies the end of all the calling operations upon detecting "–1".

In the foregoing embodiment the opening or closing operation of the panel cover 81 is not considered, but said operation may be considered to represent the intention of the operator to designate another destination and may be utilized for resetting the key input timer TK.

Also a key actuation after the confirmation of a designation may be considered to represent the intention of the operator to designate another destination and may be utilized for prolonging the time of the timer TK.

Furthermore, in a facsimile apparatus which is incapable of simultaneous transmission but capable of transmission of the same message (i.e., a single body of information) to each of plural destinations, the communication may be immediately started after the designation of a destination, if the original document is already present.

As explained in the foregoing, the present invention enables calling to plural destinations with a simple operation, thereby improving the structure and the operability of the apparatus.

Although the foregoing explanation has been limited to a facsimile apparatus, the present invention is naturally applicable also to any communication apparatus with an automatic calling function, such as a telephone.

In the above-explained embodiment, the calls are made in the order of the one-touch dialling buttons (1)–(32), contracted dialling inputs *00–*99 and ten-key dialling inputs T1–T4, but it is also possible to make the calling operations in the order of designations made by the operator. In such case there is provided a call memory (for example as an area in the RAM), and the address data of the one-touch dialling buttons, contracted dialling inputs and ordinary dialling inputs of the destinations are stored in said memory. In the calling operations, the address data in said call memory are read in succession, and the calling operation is made by a telephone number obtained from thus read address data. In this manner the calls are made in the order of designation.

The present invention is not limited to the foregoing embodiment but is subject to various modifications within the scope and spirit of the appended claims.

We claim:

1. A communication apparatus comprising:

calling means for sending destination information corresponding to a communication destination over a communication line to an exchange on the communication line to cause the exchange to connect the communication line to the communication destination;

designating means for manually and successively designating a plurality of communication destinations and for storing the plurality of communication destinations, without a calling operation by said calling means between each successive designation; and control means for detecting a plurality of manual designation operations of said designating means, and responsive to a condition that before the lapse of a predetermined time period after the detection of one of said plurality of manual designation operations, a next manual designation operation is not detected, for causing said calling means to automatically and successively call all of the communication destinations already designated by said designating means, wherein the predetermined time period is reset after each successive designation and before the calling operation.

2. A communication apparatus according to claim 1, further comprising a memory for storing dialling data corresponding to each destination, wherein said control means reads from said memory the dialling data of the destination designated by said designation means and effects calling operations.

3. A communication apparatus according to claim 1, wherein said control means is adapted to call each destination designated by said designation means, in a predetermined order.

4. A communication apparatus according to claim 1, wherein said control means is adapted to call each destination, in the order of designations made by said designation means.

5. A communication apparatus according to claim 1, wherein said designation means includes one-touch dialling keys, contracted dialling keys and numeral keys, and wherein said predetermined period is variable in accordance with whether the destination is designated by means of said one-touch dialling keys or by means of said numeral keys.

6. A communication apparatus according to claim 5, wherein said predetermined period selected when the destination is designated by means of said numeral keys, is longer than that selected when the destination is designated by means of said one-touch dialling keys.

7. An apparatus according to claim 1, wherein the predetermined time period varies as a function of the number of designations.

8. A facsimile apparatus comprising:
designating means for manually and successively designating several communication destinations without a dialing operation of said facsimile apparatus between each successive designation;
auto-dial means for automatically dialing each communication destination designated by said designating means;
communication means for effecting facsimile communication;
detection means for detecting a plurality of manual designation operations of said designating means; and
control means having timer means arranged to restart upon a detection of one of said plurality of designation operations by said detection means, for causing said auto-dial means to effect automatic and successive dialing of all of the communication destinations already designated by said designating means after a predetermined time period counted by said timer means during which no manual designation operation has been detected by said detection means, wherein the predetermined time period is reset after each successive designation and before the dialing operation.

9. A facsimile apparatus according to claim 8, wherein said control means includes a memory for storing therein dialling data corresponding to the destinations designated by said designation means, and effect the dialling operation in accordance with the dialling data stored in the memory.

10. A facsimile apparatus according to claim 8, wherein, when said designation means designates a plurality of destinations, said control means controls the dialling of the plurality of destinations in a predetermined order.

11. A facsimile apparatus according to claim 10, wherein the predetermined order is designated by said designation means.

12. A facsimile apparatus according to claim 8, wherein said designation means includes one-touch dialling keys, contracted dialling keys and numeral keys, and wherein said timer times out after a timer period which is variable in accordance with whether the destination is designated by means of said one-touch dialling keys or by means of said numeral keys.

13. A facsimile apparatus according to claim 12, wherein said timer period selected when the destination is designated by means of said numeral keys, is longer than that selected when the destination is designated by means of said one-touch dialling keys.

14. A facsimile apparatus according to claim 8, wherein said facsimile communication means is adapted to send a single body of image data to each of plural destinations designated by said designation means.

15. A facsimile apparatus according to claim 8, wherein said facsimile communication means is adapted to receive image data from plural destinations designated by said designation means.

16. An apparatus according to claim 8, wherein the predetermined time period varies as a function of the number of designations.

17. A data communication apparatus comprising:
an input unit which inputs a plurality of communication destinations;
a data communication unit which communicates data with the plurality of communication destinations over a communication line;
a discrimination unit which discriminates completion of the input of the plurality of communication destinations by said input unit in dependence upon the lapse of a predetermined time period after the input of each and every one of the plurality of communication destinations, the predetermined time period being reset after each successive designation and before a calling operation by a calling unit; and
said calling unit which sends first destination information corresponding to a first designated communication destination over the communication line to an exchange on the communication line, in response to a discrimination by said discrimination unit of the completion of the input of the plurality of communication destinations, to cause the exchange to connect the communication line to the first designated communication destination,
wherein said data communication unit communicates data with the communication destination to which the communication line is connected in accordance with the first destination information sent by the calling unit, and after completion of the communication by said data communication unit said calling unit sends second destination information corresponding to a second designated communication destination over the communication line to cause the exchange to connect the communication line to the second designated communication destination, and said data communication unit communicates data with the second designated communication destination corresponding to the second destination information.

18. An apparatus according to claim 17, wherein said discrimination means discriminates that the input of the plurality of communication destinations by said input unit has been completed when the predetermined time period elapses after the input of one of the plurality of communication destinations.

19. An apparatus according to claim 17, wherein said communication unit communicates with the plurality of communication destinations when said discrimination unit discriminates that the input of the plurality of destinations has been completed.

20. An apparatus according to claim 17, wherein said input unit includes a plurality of keys.

21. An apparatus according to claim 17, wherein said data communication unit communicates facsimile data.

22. An apparatus according to claim 17, wherein said data communication unit communicates the data with the plurality of communication destinations in sequence.

23. An apparatus according to claim 17, wherein the predetermined time period varies as a function of the number of designations.

24. A data communication apparatus comprising:
an input unit which inputs a communication destination; and
a data communication unit which, when said input unit has completed inputting a second communication destination before the lapse of a predetermined time period after the input of a first communication destination, the predetermined time period resetting after the second communication destination has been input, (1) sends first destination information corresponding to the first communication destination over a communication line to an exchange on the communication line to cause the exchange to connect the communication line to the first communication destination after the lapse of the reset predetermined time period and (2) communicates data with the first communication destination, and after completion of the data communication with the first communication destination, (3) sends second destination information corresponding to the second communication destination over the communication line to cause the exchange to connect the communication line to the second communication destination and (4) communicates data with the second communication destination, and which, when the predetermined time period lapses after the input of the first communication destination, (5) sends the first destination information over the communication line to the exchange on the communication line to cause the exchange to connect the communication line to the first communication destination and (6) communicates data with the first communication destination.

25. An apparatus according to claim 24, wherein said input unit includes a plurality of keys.

26. An apparatus according to claim 24, wherein said data communication unit communicates facsimile data.

27. An apparatus according to claim 24, wherein the predetermined time period varies as a function of the number of designations.

28. A communication apparatus comprising:
calling means for sending destination information corresponding to a communication destination over a communication line to an exchange on the communication line to cause the exchange to connect the communication line to the communication destination;
designating means for manually and successively designating a plurality of communication destinations; and
control means for (i) detecting a plurality of manual designation operations of said designating means, for (ii) determining an availability of each destination in successive manual designation operations, for (iii) determining a completion of successive manual destination operations and (iv) responsive to the completion of the successive manual designation operations, for causing said calling means to send sequentially destination information corresponding to each of the plurality of communication destinations designated in the plurality of manual designation operations, said control meads determining that the successive manual designation operations are completed when one of the plurality of manual designation operations of said designating means has not been detected within a predetermined time period, wherein the predetermined time period is reset after each successive designation operation and before the calling operation.

29. An apparatus according to claim 28, further comprising manual instruction means for manually instructing a start of a communication operation,
wherein said control means causes said calling means to successively call the plurality of destinations designated in the successive manual designation operations in response to the manual start instruction by said manual instruction means.

30. An apparatus according to claim 28, wherein said control means causes said calling means to perform the calling operation, in a case where at least one available destination has been designated in the successive manual designation operations.

31. An apparatus according to claim 28, wherein said control means is adapted to call each destination designated by said designating means, in a predetermined order.

32. An apparatus according to claim 28, wherein said control means is adapted to call each destination in the order of designations made by said designating means.

33. An apparatus according to claim 28, wherein said designating means includes one-touch dialing keys.

34. An apparatus according to claim 33, wherein said designating means further includes abbreviated dialing keys.

35. An apparatus according to claim 34, wherein said designating means further includes numeral keys.

36. An apparatus according to claim 35, wherein said predetermined period is variable according to whether the destination is designated by means of said one-touch dialing keys or by means of said numeral keys.

37. An apparatus according to claim 36, wherein said predetermined period selected when the destination is designated with said numeral keys, is longer than that selected when the destination is designated with said one-touch dialing keys.

38. An apparatus according to claim 28, wherein the predetermined time period varies as a function of the number of designations.

39. A communication apparatus, comprising:
first memory means for storing a plurality of predetermined telephone numbers respectively corresponding to a plurality of destinations;
designating means for designating one of the telephone numbers stored in the first memory means so as to designate a telephone number to be dialed;
input means for inputting a telephone number digit-by-digit so as to designate a telephone number to be dialed;
second memory means for storing information according to the designation by said designation means and the designation by said input means;
discrimination means for determining a completion of telephone number designation when a first time period elapses after the designation by said designation means, and for determining the completion of telephone number designation when a second time period longer than the first time period elapses after the designation by said input means; and calling means for dialing one or more telephone numbers in accordance with (i) the information stored in said second memory means and (i) the determination of the completion of telephone number designation by said discrimination means, wherein the first time period varies as a function of the number of designations.

40. An apparatus according to claim 39, wherein said selection means selects a telephone number in accordance with depression of a one-touch dial key or depression of two digits on a ten-key pad.

41. A data communication method in a data communication apparatus comprising the steps of:
receiving from an input unit of the data communication apparatus a first communication destination;
setting a timer to a predetermined time period after the first communication destination is input;
receiving from the input unit a second communication destination before the lapse of the predetermined time period after receiving the first communication destination; resetting the timer to a predetermined time period after the second communication destination is input,
after the completion of receiving the second communication destination, sending first destination information corresponding to the first communication destination over a communication line to an exchange on the communication line to cause the exchange to connect the communication line to the first communication destination after the lapse of the reset predetermined time period;
communicating data with the first communication destination;
after completion of the data communication with the first communication destination, sending second destination information corresponding to the second communication destination over the communication line to cause the exchange to connect the communication line to the second communication destination;
communicating data with the second communication destination; and
if the predetermined time period lapses after receiving the first communication destination, sending the first destination information over the communication line to the exchange on the communication line to cause the exchange to connect the communication line to the first communication destination and communicating data with the first communication destination.

42. A data communication method according to claim 41, wherein the input unit has a plurality of keys.

43. A data communication method according to claim 41, wherein facsimile data is communicated.

44. A data communication method according to claim 41, wherein the predetermined time period varies as a function of the number of designations.

45. A communication method in a communication apparatus comprising the steps of:
sending destination information corresponding to a communication destination over a communication line to an exchange on the communication line to cause the exchange to connect the communication line to the communication destination;
receiving a manually and successively designated plurality of communication destinations from an input unit of the communication apparatus;
detecting a plurality of manual designations received in said receiving step;
determining firstly an availability of each destination in successive manual designations and a completion of successive manual designations when one of the plurality of manual designations received in said receiving step has not been detected by said detecting step within a predetermined period,
resetting the predetermined time period after each received successive designation; and
when said determining step determines the completion of successive manual designations, causing said sending step to send sequentially destination information corresponding to each of the plurality of communication destinations designated in the plurality of manual designations.

46. A communication method according to claim 45, further comprising the step of receiving a manual instruction for a start operation causing said sending step to send successively the plurality of destinations designated in the successive manual designation operations.

47. A communication method according to claim 45, wherein said causing step causes said sending step to perform in a case where at least one available destination has been designated in the successive manual designations.

48. A communication method according to claim 45, wherein said sending step sends the destination information to each designated communication destination in a predetermined order.

49. A communication method according to claim 45, wherein said sending step sends the destination information to each designated communication destination in the order of designations made in said designating step.

50. A communication method according to claim 47, wherein the predetermined time period varies as a function of the number of designations.

51. A communication method according to claim 45, wherein said receiving step receives designations made by one-touch dialing.

52. A communication method according to claim 51, wherein said receiving step receives designations made by abbreviated dialing.

53. A communication method according to claim 52, wherein said receiving step receives designations made by numerical dialing.

54. A communication method according to claim 53, further comprising a step of selecting the predetermined period, wherein the predetermined period varies according to whether the received destination has been designated by using one-touch dialing, abbreviated dialing or numerical dialing.

55. A communication method according to claim 54, wherein the predetermined period selected when the received destination has been designated by using numerical dialing is longer than the predetermined period selected when the received destination has been designated by using one-touch dialing.

* * * * *

UNITED STATES PATENT AND TRADEMARK OFFICE
CERTIFICATE OF CORRECTION

PATENT NO. : 5,721,766

DATED : February 24, 1998

INVENTOR(S) : MOTOAKI YOSHINO ET AL.

Page 1 of 2

It is certified that error appears in the above-identified patent and that said Letters Patent is hereby corrected as shown below:

TITLE PAGE:

[56] REFERENCES CITED

Foreign Patent Documents
      "61-107844 5/1986 Japan" should read
      --61-127844 5/1986 Japan--.

COLUMN 2

Line 47, "batton/lamp 53;" should read
      --button/lamp 73;--.

COLUMN 5

Line 13, "unit 1" should read --until--.
    Line 61, "*00-*99." should read --*00 - *99.--.

COLUMN 7

Line 15, "designation" should read --designating--.
    Line 19, "designation" should read --designating--.
    Line 23, "designation" should read --designating--.
    Line 25, "designation" should read --designating--.
    Line 41, "dialing" should read --dialling--.
    Line 43, "dialing" should read --dialling--.
    Line 60, "dialing" should read --dialling--.

COLUMN 8

Line 55, "unit" (first occurrence) should read
      --unit,--.

UNITED STATES PATENT AND TRADEMARK OFFICE
CERTIFICATE OF CORRECTION

PATENT NO. : 5,721,766

DATED : February 24, 1998

INVENTOR(S) : MOTOAKI YOSHINO ET AL.

It is certified that error appears in the above-identified patent and that said Letters Patent is hereby corrected as shown below:

COLUMN 11

```
Line 1, "dialing" should read --dialling--.
Line 3, "(i)" should read --(ii)--.
```

COLUMN 12

```
Line 17, "sequentially" should read --sequential--.
```

Signed and Sealed this

Fourth Day of August, 1998

Attest:

BRUCE LEHMAN

Attesting Officer

Commissioner of Patents and Trademarks